US010402686B1

(12) United States Patent
Kim et al.

(10) Patent No.: US 10,402,686 B1
(45) Date of Patent: *Sep. 3, 2019

(54) LEARNING METHOD AND LEARNING DEVICE FOR OBJECT DETECTOR TO BE USED FOR SURVEILLANCE BASED ON CONVOLUTIONAL NEURAL NETWORK CAPABLE OF CONVERTING MODES ACCORDING TO SCALES OF OBJECTS, AND TESTING METHOD AND TESTING DEVICE USING THE SAME

(71) Applicant: Stradvision, Inc., Pohang, Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Pohang-si (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Pohang-si (KR); Hongmo Je, Pohang-si (KR); Hojin Cho, Gyeongsangbuk-do (KR)

(73) Assignee: Stradvision, Inc., Pohang, Gyeongbuk (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/258,248

(22) Filed: Jan. 25, 2019

(51) Int. Cl.
G06K 9/00 (2006.01)
G06K 9/62 (2006.01)

(52) U.S. Cl.
CPC ......... *G06K 9/6232* (2013.01); *G06K 9/6231* (2013.01); *G06K 9/6256* (2013.01); *G06K 2209/23* (2013.01)

(58) Field of Classification Search
CPC ....... G06K 9/6257; G06T 7/246; G06T 15/10; G06T 19/006; G06T 2207/20081; G06F 17/11; G06N 3/0454
See application file for complete search history.

(56) References Cited

U.S. PATENT DOCUMENTS

2016/0140424 A1\* 5/2016 Wang ........................ G06K 9/66 382/156
2017/0372174 A1\* 12/2017 Wshah ................. G06K 9/6256

(Continued)

*Primary Examiner* — Shefali D Goradia
(74) *Attorney, Agent, or Firm* — Kaplan Breyer Schwarz, LLP

(57) ABSTRACT

A method for an object detector to be used for surveillance based on a convolutional neural network capable of converting modes according to scales of objects is provided. The method includes steps of: a learning device (a) instructing convolutional layers to output a feature map by applying convolution operations to an image and instructing an RPN to output ROIs in the image; (b) instructing pooling layers to output first feature vectors by pooling each of ROI areas on the feature map per each of their scales, instructing first FC layers to output second feature vectors, and instructing second FC layers to output class information and regression information; and (c) instructing loss layers to generate class losses and regression losses by referring to the class information, the regression information, and their corresponding GTs.

28 Claims, 5 Drawing Sheets

(56) References Cited

U.S. PATENT DOCUMENTS

2018/0260415 A1* 9/2018 Gordo Soldevila ........................ G06K 9/4628
2018/0300880 A1* 10/2018 Fan ........................... G06T 7/11

* cited by examiner

LEARNING METHOD AND LEARNING DEVICE FOR OBJECT DETECTOR TO BE USED FOR SURVEILLANCE BASED ON CONVOLUTIONAL NEURAL NETWORK CAPABLE OF CONVERTING MODES ACCORDING TO SCALES OF OBJECTS, AND TESTING METHOD AND TESTING DEVICE USING THE SAME

FIELD OF THE DISCLOSURE

The present disclosure relates to a learning method, a learning device, a testing method and a testing device for use with an autonomous vehicle; and more particularly, to the learning method and the learning device for an object detector based on CNN, and the testing method and the testing device using the same.

BACKGROUND OF THE DISCLOSURE

In machine learning, a convolutional neural network (CNN, or ConvNet) is a class of deep, feed-forward artificial neural network that has successfully been applied to analyzing visual imagery.

FIG. 1 is a drawing illustrating a learning process using the CNN according to a conventional art.

FIG. 1 illustrates a process of comparing a bounding box estimated by a learning device with that of its ground truth (GT).

Referring to FIG. 1, a conventional learning device estimates the bounding box and then compares the estimated bounding box with the GT's bounding box, to thereby obtain one or more loss values. Herein, the loss values mean values of difference between the estimated bounding box and the GT's bounding box. For example, the loss values may include $dx_c, dy_c, dw, dh$ as shown in FIG. 1.

First of all, the learning device of FIG. 1 obtains an RGB image and inputs the RGB image to a convolutional layer. After the RGB image passes through the convolutional layer, a feature map is generated such that a width and a height of the RGB image are decreased and the number of channels is increased.

The learning device of FIG. 1 may allow the feature map to be fed into a region proposal network (RPN) to generate proposal boxes and then may apply either max pooling operations or average pooling operations to pixel data included in areas, corresponding to the proposal boxes, on the feature map, to thereby generate a pooled feature map. Herein, the max pooling is a method of selecting each largest value in each of sub-regions in its corresponding proposal box as each of representative values per each of the sub-regions and the average pooling is a method of calculating each average value in each of the sub-regions in its corresponding proposal box as each of representative values per each of the sub-regions.

Then, the learning device of FIG. 1 may input the pooled feature map to a fully connected (FC) layer. Herein, the learning device allows the FC layer to check a type of the object on the RGB image through classification operations. The pooled feature map may also be referred to as a "feature vector."

Further, one or more bounding boxes on the inputted RGB image may be estimated by the FC layer, and the loss values, which are obtained by comparing the estimated bounding boxes with their GT's bounding boxes. Herein, the GT's bounding boxes are bounding boxes accurately including the object on the image, which may be generated directly by a person.

Lastly, the learning device of FIG. 1 may adjust at least one parameter of the FC layer, at least one parameter of the RPN, and at least one parameter of the convolutional layer in order to reduce the loss values while performing the backpropagation. After the parameters of the CNN are adjusted, new bounding boxes corresponding to a new object on a test image may be estimated.

However, if areas, corresponding to ROIs, on a feature map outputted from the convolutional layer are pooled with a single scale, information expressed by the feature map pooled with the single scale is limited. Thus, a larger number of features need to be used to accurately detect the object. Accordingly, the number of operations required for detecting the object increases and the performance is deteriorated.

Hence, the present application proposes a method for reducing the number of operations by allowing each of pooling layers having each different scale to perform each of pooling operations.

SUMMARY OF THE DISCLOSURE

It is an object of the present disclosure to solve all the aforementioned problems.

It is another object of the present disclosure to provide a learning method and a learning device for reducing the number of operations by allowing each of pooling layers having each different scale to perform each of pooling operations, and a testing method and a testing device using the same.

In accordance with one aspect of the present disclosure, there is provided a method for learning a convolutional neural network (CNN)-based object detector, including steps of: (a) a learning device, if a training image including at least one object is inputted, instructing at least one convolutional layer to apply at least one convolution operation to the training image, to thereby output at least one feature map and instructing a region proposal network (RPN) to output k regions of interest (ROIs) in the training image by using the feature map; (b) the learning device (i) instructing each of pooling layers having each different pooling scale to pool each of areas, corresponding to each of the k ROIs, on the feature map per each of their scales, to thereby output each of k first feature vectors corresponding to each of the k ROIs per each of their scales, (ii) instructing each of first fully connected (FC) layers corresponding to each of the pooling layers to output each of k second feature vectors per each of their scales by using each of the k first feature vectors per each of their scales, and (iii) instructing one or more second FC layers to output each of class information and each of regression information corresponding to each of the k ROIs by using each of the k second feature vectors per each of their scales; and (c) the learning device instructing a first loss layer to generate class losses and regression losses corresponding to the k ROIs by referring to each of the class information, each of the regression information, and their corresponding first ground truths (GTs), to thereby learn the second FC layers, the first FC layers, and the convolutional layer through backpropagation by using the class losses and the regression losses.

As one example, the k ROIs are selected among predetermined ROI candidates by the RPN, wherein, after the step of (a), the learning device instructs a second loss layer to generate ROI losses by referring to the ROI candidates and their corresponding second GTs, to thereby learn the RPN through backpropagation by using the ROI losses.

As one example, the second FC layers include a (2-1)-st FC layer and (2-2)-nd FC layers, wherein, at the step of (b), the learning device (i) instructs the (2-1)-st FC layer to concatenate each of the k second feature vectors per each of their scales outputted from each of the first FC layers, to thereby output a third feature vector and (ii) instructs the (2-2)-nd FC layers to output each of the class information and each of the regression information corresponding to the k ROIs by using the third feature vector.

As one example, at the step of (c), the learning device learns each of the first FC layers by using at least part of each of the class losses and each of the regression losses corresponding to each of the k second feature vectors per each of their scales outputted from each of the first FC layers.

As one example, the learning device learns each of the first FC layers through backpropagation by applying each of weights to each of the class losses and each of regression losses, wherein said each of weights are determined by referring to information on degrees of contribution by each of the first FC layers to each of the class losses and each of the regression losses.

As one example, the learning device determines each of the number of channels of each of the second feature vectors per each of their scales outputted from each of the first FC layers to be same with each other.

As one example, the learning device determines a total number of channels of the second feature vectors outputted from each of the first FC layers to be less than a predetermined number.

In accordance with another aspect of the present disclosure, there is provided a method for testing a convolutional neural network (CNN)-based object detector, including steps of: (a) on condition that a learning device (1) has instructed at least one convolutional layer to apply at least one convolution operation to a training image, to thereby output at least one feature map for training and has instructed a region proposal network (RPN) to output k regions of interest (ROIs) for training in the training image by using the feature map for training, (2) (i) has instructed each of pooling layers having each different pooling scale to pool each of areas, corresponding to each of the k ROIs for training, on the feature map for training per each of their scales, to thereby output each of k first feature vectors for training corresponding to each of the k ROIs for training per each of their scales, (ii) has instructed each of first fully connected (FC) layers corresponding to each of the pooling layers to output each of k second feature vectors for training per each of their scales by using each of the k first feature vectors for training per each of their scales, and (iii) has instructed one or more second FC layers to output each of class information for training and each of regression information for training corresponding to each of the k ROIs for training by using each of the k second feature vectors for training per each of their scales, and (3) has instructed a first loss layer to generate class losses and regression losses corresponding to the k ROIs for training by referring to each of the class information for training, each of the regression information for training, and their corresponding first ground truths (GTs), to thereby learn the second FC layers, the first FC layers, and the convolutional layer through backpropagation by using the class losses and the regression losses, a testing device (i) instructing the convolutional layer to apply at least one convolution operation to a test image including at least one object, to thereby output at least one feature map for testing and (ii) instructing the RPN to output m ROIs for testing in the test image by using the feature map for testing; and (b) the testing device (i) instructing each of the pooling layers having each different pooling scale to pool each of areas, corresponding to each of the m ROIs for testing, on the feature map for testing per each of their scales, to thereby output each of m first feature vectors for testing corresponding to each of the m ROIs for testing per each of their scales, (ii) instructing each of the first FC layers corresponding to each of the pooling layers to output each of m second feature vectors for testing per each of their scales by using each of the m first feature vectors for testing per each of their scales, and (iii) instructing the second FC layers to output each of class information for testing and each of regression information for testing corresponding to each of the m ROIs for testing by using each of the m second feature vectors for testing per each of their scales.

As one example, the k ROIs for training are selected among predetermined ROI candidates for training by the RPN, wherein the learning device has instructed a second loss layer to generate ROI losses by referring to the ROI candidates for training and their corresponding second GTs, to thereby learn the RPN through backpropagation by using the ROI losses.

As one example, the second FC layers include a (2-1)-st FC layer and (2-2)-nd FC layers, wherein, at the step of (b), the testing device (i) instructs the (2-1)-st FC layer to concatenate each of the m second feature vectors for testing per each of their scales outputted from each of the first FC layers, to thereby output a third feature vector for testing and (ii) instructs the (2-2)-nd FC layers to output each of the class information for testing and each of the regression information for testing corresponding to the m ROIs for testing by using the third feature vector for testing.

As one example, at the process of (3), the learning device has learned each of the first FC layers by using at least part of each of the class losses and each of the regression losses corresponding to each of the k second feature vectors for training per each of their scales outputted from each of the first FC layers.

As one example, the learning device has learned each of the first FC layers through backpropagation by applying each of weights to each of the class losses and each of regression losses, wherein said each of weights are determined by referring to information on degrees of contribution by each of the first FC layers to each of the class losses and each of the regression losses.

As one example, the testing device determines each of the number of channels of each of the second feature vectors for testing per each of their scales outputted from each of the first FC layers to be same with each other.

As one example, the testing device determines a total number of channels of the second feature vectors for testing outputted from each of the first FC layers to be less than a predetermined number.

In accordance with still another aspect of the present disclosure, there is provided a learning device for learning a convolutional neural network (CNN)-based object detector, including: at least one memory that stores instructions; and at least one processor configured to execute the instructions to: perform processes of (I) instructing at least one convolutional layer to apply at least one convolution operation to a training image including at least one object, to thereby output at least one feature map and instructing a region proposal network (RPN) to output k regions of interest (ROIs) in the training image by using the feature map, (II) (i) instructing each of pooling layers having each different pooling scale to pool each of areas, corresponding to each of the k ROIs, on the feature map per each of their scales, to thereby output each of k first feature vectors corresponding to each of the k ROIs per each of their scales, (ii) instructing each of first fully connected (FC) layers corresponding to each of the pooling layers to output each of k second feature vectors per each of their scales by using each of the k first feature vectors per each of their scales, and (iii) instructing one or more second FC layers to output each of class information and each of regression information corresponding to each of the k ROIs by using each of the k second feature vectors per each of their scales, and (III) instructing a first loss layer to generate class losses and regression losses corresponding to the k ROIs by referring to each of the class information, each of the regression information, and their corresponding first ground truths (GTs), to thereby learn the second FC layers, the first FC layers, and the convolutional layer through backpropagation by using the class losses and the regression losses.

As one example, the k ROIs are selected among predetermined ROI candidates by the RPN, wherein, after the process of (I), the processor instructs a second loss layer to generate ROI losses by referring to the ROI candidates and their corresponding second GTs, to thereby learn the RPN through backpropagation by using the ROI losses.

As one example, the second FC layers include a (2-1)-st FC layer and (2-2)-nd FC layers, wherein, at the process of (II), the processor (i) instructs the (2-1)-st FC layer to concatenate each of the k second feature vectors per each of their scales outputted from each of the first FC layers, to thereby output a third feature vector and (ii) instructs the (2-2)-nd FC layers to output each of the class information and each of the regression information corresponding to the k ROIs by using the third feature vector.

As one example, at the process of (III), the processor learns each of the first FC layers by using at least part of each of the class losses and each of the regression losses corresponding to each of the k second feature vectors per each of their scales outputted from each of the first FC layers.

As one example, the processor learns each of the first FC layers through backpropagation by applying each of weights to each of the class losses and each of regression losses, wherein said each of weights are determined by referring to information on degrees of contribution by each of the first FC layers to each of the class losses and each of the regression losses.

As one example, the processor determines each of the number of channels of each of the second feature vectors per each of their scales outputted from each of the first FC layers to be same with each other.

As one example, the processor determines a total number of channels of the second feature vectors outputted from each of the first FC layers to be less than a predetermined number.

In accordance with still yet another aspect of the present disclosure, there is provided a testing device for testing a convolutional neural network (CNN)-based object detector, including: at least one memory that stores instructions; and at least one processor, on condition that a learning device (1) has instructed at least one convolutional layer to apply at least one convolution operation to a training image, to thereby output at least one feature map for training and has instructed a region proposal network (RPN) to output k regions of interest (ROIs) for training in the training image by using the feature map for training, (2) (i) has instructed each of pooling layers having each different pooling scale to pool each of areas, corresponding to each of the k ROIs for training, on the feature map for training per each of their scales, to thereby output each of k first feature vectors for training corresponding to each of the k ROIs for training per each of their scales, (ii) has instructed each of first fully connected (FC) layers corresponding to each of the pooling layers to output each of k second feature vectors for training per each of their scales by using each of the k first feature vectors for training per each of their scales, and (iii) has instructed one or more second FC layers to output each of class information for training and each of regression information for training corresponding to each of the k ROIs for training by using each of the k second feature vectors for training per each of their scales, and (3) has instructed a first loss layer to generate class losses and regression losses corresponding to the k ROIs for training by referring to each of the class information for training, each of the regression information for training, and their corresponding first ground truths (GTs), to thereby learn the second FC layers, the first FC layers, and the convolutional layer through backpropagation by using the class losses and the regression losses; configured to execute the instructions to: perform processes of (I) (i) instructing the convolutional layer to apply at least one convolution operation to a test image including at least one object, to thereby output at least one feature map for testing and (ii) instructing the RPN to output m ROIs for testing in the test image by using the feature map for testing, and (II) (i) instructing each of the pooling layers having each different pooling scale to pool each of areas, corresponding to each of the m ROIs for testing, on the feature map for testing per each of their scales, to thereby output each of m first feature vectors for testing corresponding to each of the m ROIs for testing per each of their scales, (ii) instructing each of the first FC layers corresponding to each of the pooling layers to output each of m second feature vectors for testing per each of their scales by using each of the m first feature vectors for testing per each of their scales, and (iii) instructing the second FC layers to output each of class information for testing and each of regression information for testing corresponding to each of the m ROIs for testing by using each of the m second feature vectors for testing per each of their scales.

As one example, the k ROIs for training are selected among predetermined ROI candidates for training by the RPN, wherein the learning device has instructed a second loss layer to generate ROI losses by referring to the ROI candidates for training and their corresponding second GTs, to thereby learn the RPN through backpropagation by using the ROI losses.

As one example, the second FC layers include a (2-1)-st FC layer and (2-2)-nd FC layers, wherein, at the process of (II), the processor (i) instructs the (2-1)-st FC layer to concatenate each of the m second feature vectors for testing per each of their scales outputted from each of the first FC layers, to thereby output a third feature vector for testing and (ii) instructs the (2-2)-nd FC layers to output each of the class information for testing and each of the regression information for testing corresponding to the m ROIs for testing by using the third feature vector for testing.

As one example, at the process of (3), the learning device has learned each of the first FC layers by using at least part of each of the class losses and each of the regression losses corresponding to each of the k second feature vectors for training per each of their scales outputted from each of the first FC layers.

As one example, the learning device has learned each of the first FC layers through backpropagation by applying each of weights to each of the class losses and each of regression losses, wherein said each of weights are determined by referring to information on degrees of contribution by each of the first FC layers to each of the class losses and each of the regression losses.

As one example, the processor determines each of the number of channels of each of the second feature vectors for testing per each of their scales outputted from each of the first FC layers to be same with each other.

As one example, the processor determines a total number of channels of the second feature vectors for testing outputted from each of the first FC layers to be less than a predetermined number.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
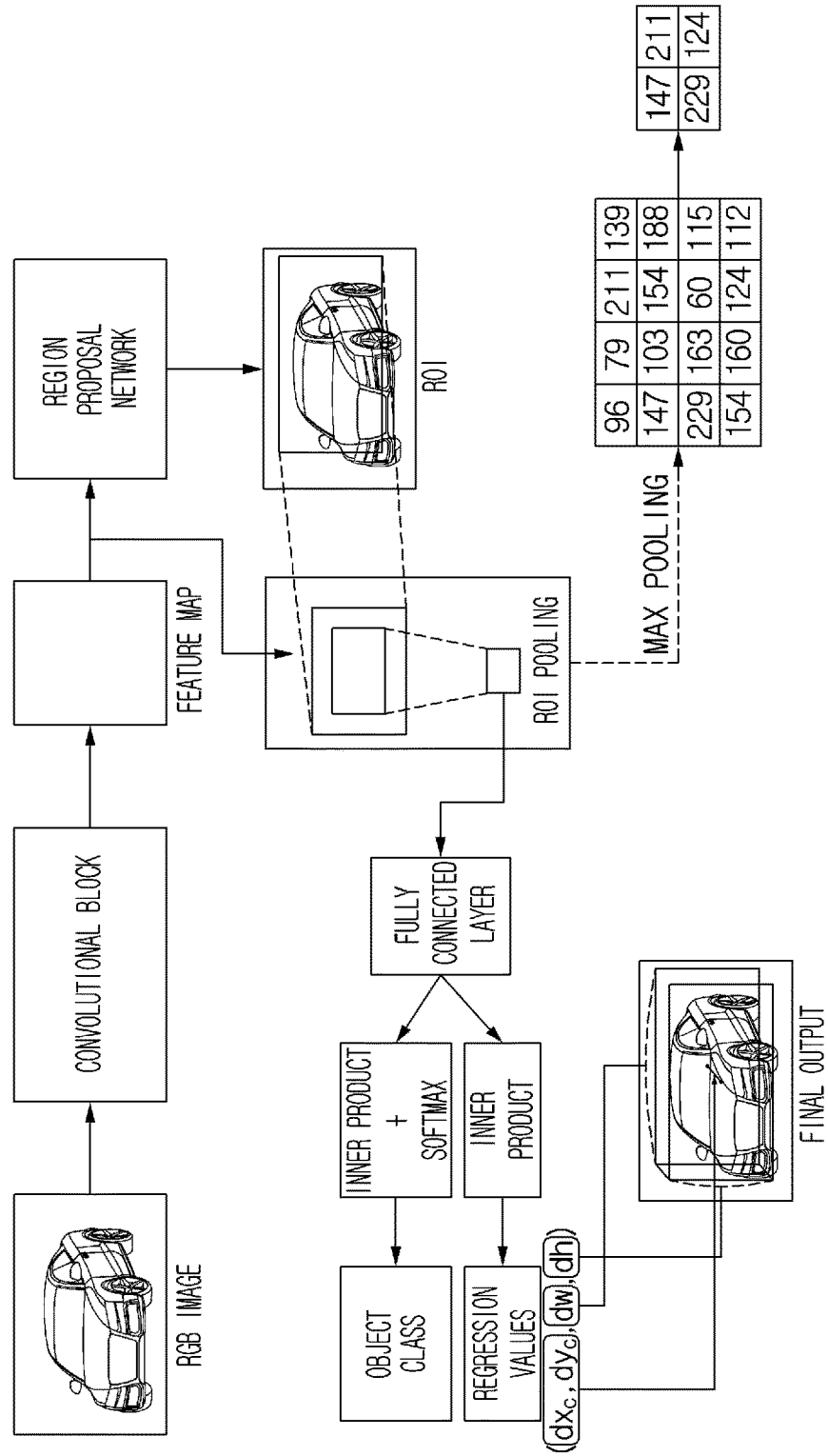
FIG. 1 is a drawing illustrating a process of estimating a bounding box by a learning device and then comparing the estimated bounding box with its corresponding ground truth (GT) bounding box in a learning process according to a conventional art.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

Figure 2:
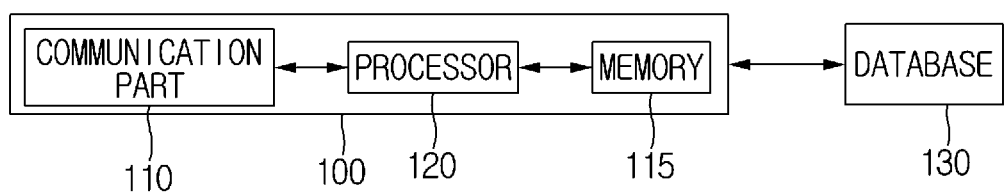
FIG. 2 is a block diagram of a learning device capable of learning an object detector based on a convolutional neural network (CNN) in accordance with one example embodiment of the present disclosure.

FIG. 2 is a block diagram of a learning device 100 in accordance with one example embodiment of the present disclosure.

Referring to FIG. 2, the learning device 100 in accordance with one example embodiment of the present disclosure may include a communication part 110 and a processor 120. Further, the learning device 100 may include a database 130 as the case may be. In addition, the learning device may further include a memory 115 capable of storing computer readable instructions for performing following processes. As one example, the processor, the memory, a medium, etc. may be integrated with an integrated processor.

Herein, the learning device 100 of the present disclosure is a digital device, and any digital device having a processor capable of performing various operations may be adopted as the learning device 100 according to the present disclosure.

The communication part 110 may obtain a training image including at least one object. Herein, the training image may be obtained from the database 130.

The processor 120 may perform (a) a first process of instructing at least one convolutional layer to apply at least one convolution operation to the training image, to thereby output at least one feature map and instructing a region proposal network (RPN) to output k regions of interest (ROIs) in the training image by using the feature map; (b) a second process of (i) instructing each of pooling layers having each different pooling scale to pool each of areas, corresponding to each of the k ROIs, on the feature map per each of their scales, to thereby output each of k first feature vectors corresponding to each of the k ROIs per each of their scales, (ii) instructing each of first fully connected (FC) layers corresponding to each of the pooling layers to output each of k second feature vectors per each of their scales by using each of the k first feature vectors per each of their scales, and (iii) instructing one or more second FC layers to output each of class information and each of regression information corresponding to each of the k ROIs by using each of the k second feature vectors per each of their scales; and (c) a third process of instructing a first loss layer to generate class losses and regression losses corresponding to the k ROIs by referring to each of the class information, each of the regression information, and their corresponding first ground truths (GTs), to thereby learn the second FC layers, the first FC layers, and the convolutional layer through backpropagation by using the class losses and the regression losses. The processes will be described in detail later.

Herein, the database 130 may be accessible by the communication part 110 of the learning device 100, and the ground truth, e.g., class information indicating whether an object is an automobile, a pedestrian, etc., and regression information indicating information on the location of the bounding box, may be recorded.

Hereinafter, a method of learning an object detector based on the CNN by using each of pooling layers having each different scale by using the learning device 100 in accordance with one example embodiment of the present disclosure will be described by referring to FIG. 3.

First of all, if the training image including at least one object is inputted, the learning device 100 instructs a convolutional layer 10 to apply at least one convolution operation to the training image, to thereby output at least one feature map.

Then the learning device 100 instructs a region proposal network (RPN) 20 to output k regions of interest (ROIs) in the training image by using the feature map. Herein, the k ROIs have been selected among predetermined ROI candidates.

Thereafter, the learning device 100 instructs each of pooling layers 30 having each different pooling scale to pool each of areas, corresponding to each of the k ROIs outputted from the RPN 20, on the feature map per each of their scales, to thereby output each of k first feature vectors corresponding to each of the k ROIs per each of their scales. Herein, in the example of FIG. 3, each of the three pooling layers 30 having each different pooling scale are illustrated, but the present disclosure is not limited to these examples. Further, a first feature vector with a large pooling scale may have a greater amount of information than a first feature vector with a small pooling scale.

Further, if each of the k first feature vectors corresponding to each of the k ROIs per each of their scales is outputted from each of the pooling layers 30, the learning device 100 instructs each of the first fully connected (FC) layers 40 corresponding to each of the pooling layers 30 to output each of the k second feature vectors per each of their scales by using each of the k first feature vectors per each of their scales. In the example of FIG. 3, it is illustrated that the number of the first FC layers 40 is 3, but this is because the number of the pooling layers 30 is 3, and the present disclosure is not limited to this example.

Further, each of the number of channels of each of the second feature vectors per each of their scales outputted from each of the first FC layers 40 may be the same with each other. For example, as illustrated in FIG. 3, each of the number of channels of the second feature vectors outputted from each of the first FC layers 40 may be 128, but the present disclosure is not limited to this example.

Further, the total number of channels of the second feature vectors outputted from the first FC layers 40 may be set to be less than a predetermined number. For example, as illustrated in FIG. 3, the total number of channels of the second feature vectors outputted from the first FC layers 40 may be 384, i.e., 128+128+128, but the present disclosure is not limited to this example. In this case, the number of channels, i.e., 384 channels, to be used for performing operations in accordance with the present disclosure becomes smaller than 4096 channels to be used for performing operations according to the conventional art, and thus an operation capability of the learning device 100 is greatly improved.

Thereafter, the learning device 100 instructs the second FC layers 50 to output each of class information and each of regression information corresponding to each of the k ROIs by using each of the k second feature vectors per each of their scales by inputting each of the k second feature vectors to the second FC layers 50.

Herein, the second FC layer 50 may include a (2-1)-st FC layer 51 and (2-2)-nd FC layers 55. The (2-1)-st FC layer 51 may concatenate each of the second feature vectors outputted from each of the first FC layers, to thereby output a third feature vector. The (2-2)-nd FC layers 55 may output each of the class information and each of the regression information corresponding to the k ROIs by using the third feature vector.

Thereafter, the learning device 100 may instruct a first loss layer 60 to generate the class losses and the regression losses corresponding to the k ROIs by referring to each of the class information, each of the regression information, and their corresponding first ground truths (GTs), to thereby learn the second FC layers, the first FC layers, and the convolutional layer through backpropagation by using the class losses and the regression losses.

Herein, the learning device 100 may learn each of the first FC layers 40 by using each of the class losses and each of the regression losses corresponding to each of the k second feature vectors per each of their scales outputted from each of the first FC layers 40. In other words, the learning device 100 may learn each of the first FC layers 40 through backpropagation by applying each of weights to each of the class losses and each of regression losses, and said each of weights are determined by referring to information on degrees of contribution by each of the first FC layers 40 to each of the class losses and each of the regression losses.

Further, the learning device 100 may instruct a second loss layer 21 to obtain ROI losses by referring to the ROI candidates and their corresponding second GTs, to thereby learn the RPN through backpropagation by using the ROI losses. Such a learning of the RPN is always possible only if the ROI candidates are outputted. Further, the ROI losses may include ROI class losses and ROI regression losses.

Figure 4:
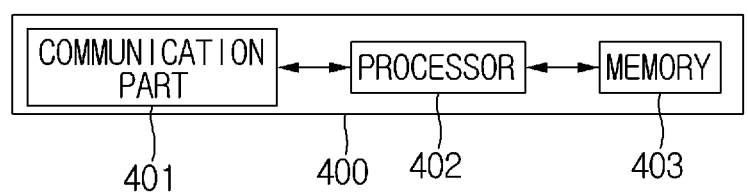
FIG. 4 is a block diagram of a testing device capable of testing the object detector based on the CNN in accordance with one example embodiment of the present disclosure.

FIG. 4 is a block diagram schematically illustrating a testing device 400 for testing the object detector based on the CNN in accordance with one example embodiment of the present disclosure.

As illustrated in FIG. 4, a testing device 400 in accordance with one example embodiment of the present disclosure may include a communication part 401 and a processor 402. It is illustrated in the drawings that the testing device 400 is distinguished from the learning device 100, but the testing device may be the same as the learning device 100. In addition, the learning device may further include a memory 403 capable of storing computer readable instructions for performing following processes. As one example, the processor, the memory, a medium, etc. may be integrated with an integrated processor.

For reference, in the description below, the phrase "for training" is added for terms related to the learning processes, and the phrase "for testing" is added for terms related to testing processes, to avoid possible confusion.

On condition that (1) the learning device (i) has instructed the convolutional layer to apply the convolution operation to the training image, to thereby output the feature map for training and (ii) has instructed the region proposal network (RPN) to output the k ROIs for training in the training image by using the feature map for training, (2) the learning device (i) has instructed each of the pooling layers having each different pooling scale to pool each of the areas, corresponding to each of the k ROIs for training, on the feature map for training per each of their scales, to thereby output each of the k first feature vectors for training corresponding to each of the k ROIs for training per each of their scales, (ii) has instructed each of the first fully connected (FC) layers corresponding to each of the pooling layers to output each of the k second feature vectors for training per each of their scales by using each of the k first feature vectors for training per each of their scales, and (iii) has instructed the second FC layers to output each of the class information for training and each of the regression information for training corresponding to each of the k ROIs for training by using each of the second feature vectors for training per each of their scales, and (3) the learning device has instructed the first loss layer to generate the class losses and the regression losses corresponding to the k ROIs for training by referring to each of the class information for training, each of the regression information for training, and their corresponding first ground truths (GTs), to thereby learn the second FC layers, the first FC layers, and the convolutional layer through the backpropagation by using the class losses and the regression losses, the communication part 401 may obtain a test image including at least one object for testing.

The processor 402 may perform (1) a first process of (i) instructing the convolutional layer to apply the convolution operation to the test image, to thereby output at least one feature map for testing and (ii) instructing the RPN to output m ROIs for testing in the test image by using the feature map for testing; and (2) a second process of (i) instructing each of the pooling layers having each different pooling scale to pool each of areas, corresponding to each of the m ROIs for testing, on the feature map for testing per each of their scales, to thereby output each of m first feature vectors for testing corresponding to each of the m ROIs for testing per each of their scales, (ii) instructing each of the first FC layers corresponding to each of the pooling layers to output each of m second feature vectors for testing per each of their scales by using each of the m first feature vectors for testing per each of their scales, and (iii) instructing the second FC layers to output each of class information for testing and each of regression information for testing corresponding to each of the m ROIs for testing by using each of the m second feature vectors for testing per each of their scales.

Herein, "m", which is the number of ROIs outputted by the RPN in the testing device 400, may be smaller than or equal to "k", which is the number of ROIs outputted by the RPN in the learning device 100, but the present disclosure is not limited to this example.

Figure 5:
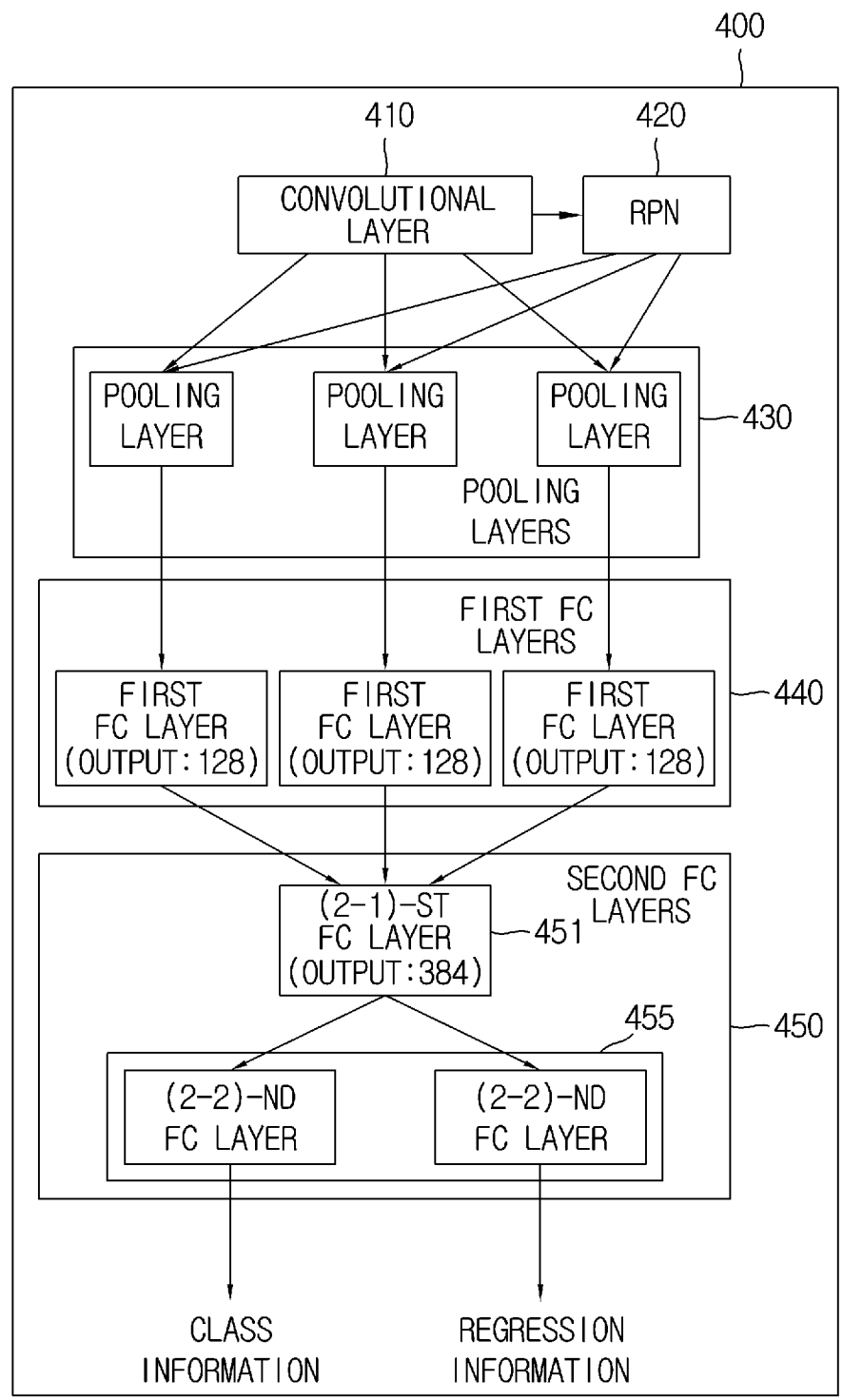
FIG. 5 is a drawing illustrating a process of testing the object detector based on the CNN in accordance with one example embodiment of the present disclosure.

Likewise, a method of testing the object detector based on the CNN by using each of the pooling layers having each different pooling scale in accordance with one example embodiment of the present disclosure by using the testing device 400 will be described by referring to FIG. 5. In the description below, detailed description easily understandable from the learning method will be omitted.

Figure 3:
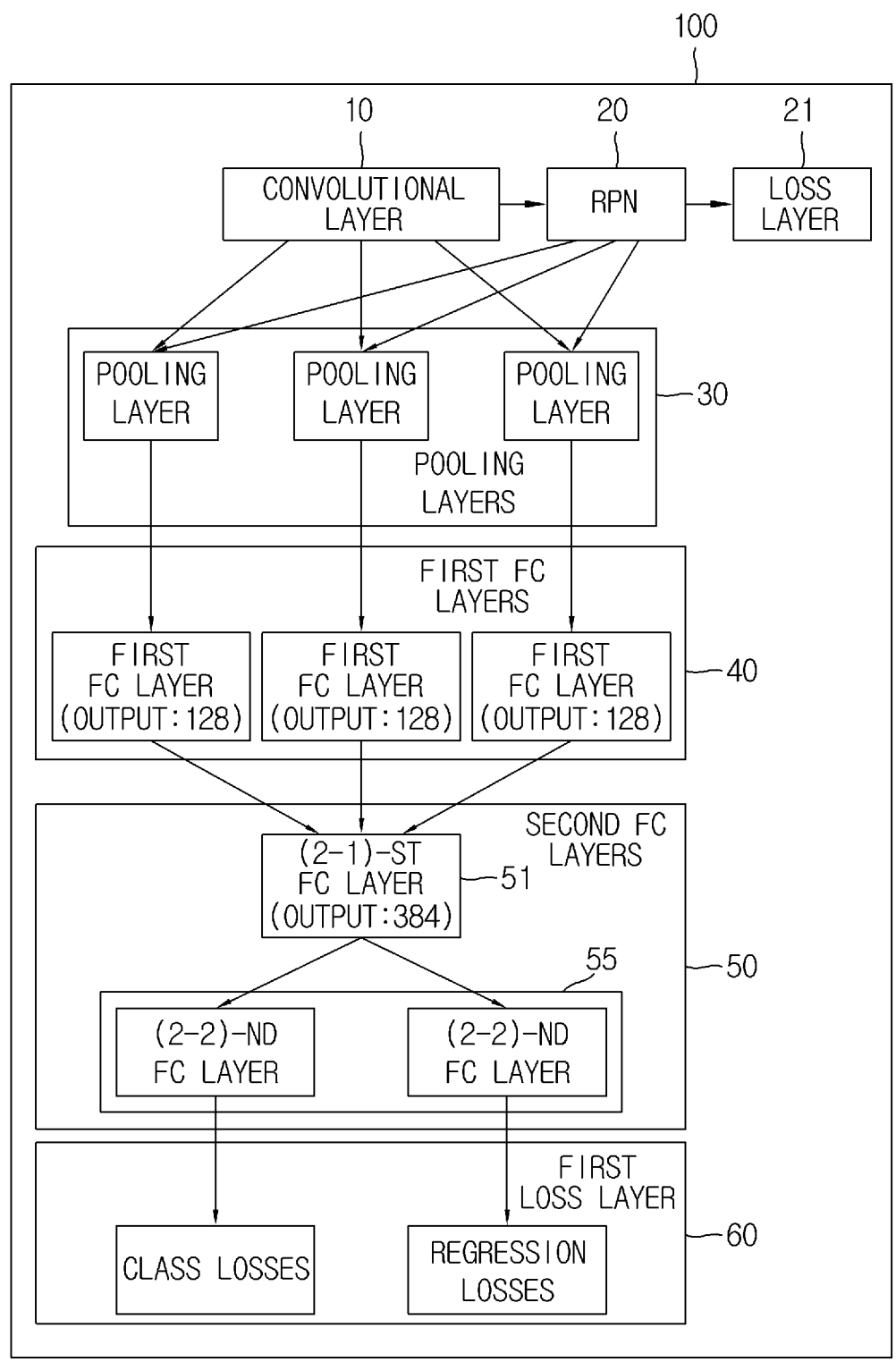
FIG. 3 is a drawing illustrating a process of learning the object detector based on the CNN in accordance with one example embodiment of the present disclosure.

First of all, on condition that the second FC layer 450, the first FC layers 440, and the convolutional layer 410 have been learned by the learning method 100 described by referring to FIG. 3, if the test image is inputted, the testing device 400 instructs the convolutional layer 410 to apply at least one convolution operation to the test image, to thereby output at least one feature map for testing.

The feature map for testing outputted from the convolutional layer 410 is inputted to the RPN 420, and the testing device 400 instructs the RPN 420 to output the m ROIs for testing corresponding to the test image by using the feature map for testing.

Thereafter, the testing device 400 instructs each of the pooling layers 430 having each different pooling scale to pool each of the areas, corresponding to each of the m ROIs for testing, on the feature map for testing per each of their scales, to thereby output each of the m first feature vectors for testing corresponding to each of the m ROIs for testing per each of their scales. Herein, FIG. 5 illustrates each of 3 pooling layers 430 having each different pooling scale, but the present disclosure is not limited to this example. Further, a first feature vector for testing having a large pooling scale may have a larger amount of information than a first feature vector having a small pooling scale.

Then the testing device 400 instructs each of the first FC layers 440 corresponding to each of the pooling layers 430 to output each of the m second feature vectors for testing per each of their scales by using each of the m first feature vectors for testing per each of their scales. FIG. 5 illustrates that there are the 3 first FC layers 440, but this is because the number of the pooling layers 430 is 3, and the present disclosure is not limited to this example.

Further, each of the numbers of channels of each of the second feature vectors for testing per each of their scales, which are outputted from each of the first FC layers 440, may be the same with each other. For example, as illustrated in FIG. 5, each of the number of channels of the second feature vectors for testing per each of their scales, which are outputted from each of the first FC layers 440, may be 128, but the present disclosure is not limited to this example.

Further, the total number of channels of the second feature vectors for testing, outputted from the first FC layers 440, may be set to be smaller than a predetermined number. For example, as illustrated in FIG. 5, the total number of channels of the second feature vectors for testing, outputted from the first FC layers 440, may be 384, i.e., 128+128+128, but the present disclosure is not limited to this example. Herein, the number of channels, i.e., 384 channels, to be used for performing operations in accordance with the present disclosure becomes smaller than 4096 channels to be used for performing operations according to the conventional art, and thus an operation capability of the testing device 400 is greatly improved.

Thereafter, the testing device 400 instructs the second FC layers 450 to output each of the class information for testing and each of the regression information for testing corresponding to each of the m ROIs for testing by using each of the m second feature vectors for testing per each of their scales.

Herein, the second FC layer 450 may include a (2-1)-st FC layer 451 and (2-2)-nd FC layers 455. The (2-1)-st FC layer 451 may concatenate each of the second feature vectors for testing outputted from each of the first FC layers 440, to thereby output a third feature vector for testing. The (2-2)-nd FC layers 455 may output each of the class information for testing and each of the regression information for testing corresponding to the m ROIs by using the third feature vector for testing.

The present disclosure has an effect of using more features on the feature map, pooled with various scales by instructing each of the pooling layers having each different pooling scale to pool the area, corresponding to the ROIs, on the feature map per each of their scales.

The present disclosure has another effect of improving a computational speed owing to a less number of channels to be used for performing operations.

The learning method and the testing method in accordance with the present disclosure may be used for surveillance by using the CNN capable of converting modes according to scales of objects. According to the modes, weights of various layers and/or those of various losses may be adjusted.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning a convolutional neural network (CNN)-based object detector, comprising steps of:
    (a) a learning device, if a training image including at least one object is inputted, instructing at least one convolutional layer to apply at least one convolution operation to the training image, to thereby output at least one feature map and instructing a region proposal network (RPN) to output k regions of interest (ROIs) in the training image by using the feature map;
    (b) the learning device (i) instructing each of pooling layers having each different pooling scale to pool each of areas, corresponding to each of the k ROIs, on the feature map per each of their scales, to thereby output each of k first feature vectors corresponding to each of the k ROIs per each of their scales, (ii) instructing each of first fully connected (FC) layers corresponding to each of the pooling layers to output each of k second feature vectors per each of their scales by using each of the k first feature vectors per each of their scales, and (iii) instructing one or more second FC layers to output each of class information and each of regression information corresponding to each of the k ROIs by using each of the k second feature vectors per each of their scales; and
    (c) the learning device instructing a first loss layer to generate class losses and regression losses corresponding to the k ROIs by referring to each of the class information, each of the regression information, and their corresponding first ground truths (GTs), to thereby learn the second FC layers, the first FC layers, and the convolutional layer through backpropagation by using the class losses and the regression losses.

2. The method of claim 1, wherein the k ROIs are selected among predetermined ROI candidates by the RPN, and
    wherein, after the step of (a), the learning device instructs a second loss layer to generate ROI losses by referring to the ROI candidates and their corresponding second GTs, to thereby learn the RPN through backpropagation by using the ROI losses.

3. The method of claim 1, wherein the second FC layers include a (2-1)-st FC layer and (2-2)-nd FC layers, and
    wherein, at the step of (b), the learning device (i) instructs the (2-1)-st FC layer to concatenate each of the k second feature vectors per each of their scales outputted from each of the first FC layers, to thereby output a third feature vector and (ii) instructs the (2-2)-nd FC layers to output each of the class information and each of the regression information corresponding to the k ROIs by using the third feature vector.

4. The method of claim 1, wherein, at the step of (c), the learning device learns each of the first FC layers by using at least part of each of the class losses and each of the regression losses corresponding to each of the k second feature vectors per each of their scales outputted from each of the first FC layers.

5. The method of claim 4, wherein the learning device learns each of the first FC layers through backpropagation by applying each of weights to each of the class losses and each of regression losses, wherein said each of weights are determined by referring to information on degrees of contribution by each of the first FC layers to each of the class losses and each of the regression losses.

6. The method of claim 1, wherein the learning device determines each of the number of channels of each of the second feature vectors per each of their scales outputted from each of the first FC layers to be same with each other.

7. The method of claim 1, wherein the learning device determines a total number of channels of the second feature vectors outputted from each of the first FC layers to be less than a predetermined number.

8. A method for testing a convolutional neural network (CNN)-based object detector, comprising steps of:
    (a) on condition that a learning device (1) has instructed at least one convolutional layer to apply at least one convolution operation to a training image, to thereby output at least one feature map for training and has instructed a region proposal network (RPN) to output k regions of interest (ROIs) for training in the training image by using the feature map for training, (2) (i) has instructed each of pooling layers having each different pooling scale to pool each of areas, corresponding to each of the k ROIs for training, on the feature map for training per each of their scales, to thereby output each of k first feature vectors for training corresponding to each of the k ROIs for training per each of their scales, (ii) has instructed each of first fully connected (FC) layers corresponding to each of the pooling layers to output each of k second feature vectors for training per each of their scales by using each of the k first feature vectors for training per each of their scales, and (iii) has instructed one or more second FC layers to output each of class information for training and each of regression information for training corresponding to each of the k ROIs for training by using each of the k second feature vectors for training per each of their scales, and (3) has instructed a first loss layer to generate class losses and regression losses corresponding to the k ROIs for training by referring to each of the class information for training, each of the regression information for training, and their corresponding first ground truths (GTs), to thereby learn the second FC layers, the first FC layers, and the convolutional layer through backpropagation by using the class losses and the regression losses, a testing device (i) instructing the convolutional layer to apply at least one convolution operation to a test image including at least one object, to thereby output at least one feature map for testing and (ii) instructing the RPN to output m ROIs for testing in the test image by using the feature map for testing; and (b) the testing device (i) instructing each of the pooling layers having each different pooling scale to pool each of areas, corresponding to each of the m ROIs for testing, on the feature map for testing per each of their scales, to thereby output each of m first feature vectors for testing corresponding to each of the m ROIs for testing per each of their scales, (ii) instructing each of the first FC layers corresponding to each of the pooling layers to output each of m second feature vectors for testing per each of their scales by using each of the m first feature vectors for testing per each of their scales, and (iii) instructing the second FC layers to output each of class information for testing and each of regression information for testing corresponding to each of the m ROIs for testing by using each of the m second feature vectors for testing per each of their scales.

9. The method of claim 8, wherein the k ROIs for training are selected among predetermined ROI candidates for training by the RPN, and
wherein the learning device has instructed a second loss layer to generate ROI losses by referring to the ROI candidates for training and their corresponding second GTs, to thereby learn the RPN through backpropagation by using the ROI losses.

10. The method of claim 8, wherein the second FC layers include a (2-1)-st FC layer and (2-2)-nd FC layers, and
wherein, at the step of (b), the testing device (i) instructs the (2-1)-st FC layer to concatenate each of the m second feature vectors for testing per each of their scales outputted from each of the first FC layers, to thereby output a third feature vector for testing and (ii) instructs the (2-2)-nd FC layers to output each of the class information for testing and each of the regression information for testing corresponding to the m ROIs for testing by using the third feature vector for testing.

11. The method of claim 8, wherein, at the process of (3), the learning device has learned each of the first FC layers by using at least part of each of the class losses and each of the regression losses corresponding to each of the k second feature vectors for training per each of their scales outputted from each of the first FC layers.

12. The method of claim 11, wherein the learning device has learned each of the first FC layers through backpropagation by applying each of weights to each of the class losses and each of regression losses, wherein said each of weights are determined by referring to information on degrees of contribution by each of the first FC layers to each of the class losses and each of the regression losses.

13. The method of claim 8, wherein the testing device determines each of the number of channels of each of the second feature vectors for testing per each of their scales outputted from each of the first FC layers to be same with each other.

14. The method of claim 8, wherein the testing device determines a total number of channels of the second feature vectors for testing outputted from each of the first FC layers to be less than a predetermined number.

15. A learning device for learning a convolutional neural network (CNN)-based object detector, comprising:
at least one memory that stores instructions; and
at least one processor configured to execute the instructions to: perform processes of (I) instructing at least one convolutional layer to apply at least one convolution operation to a training image including at least one object, to thereby output at least one feature map and instructing a region proposal network (RPN) to output k regions of interest (ROIs) in the training image by using the feature map, (II) (i) instructing each of pooling layers having each different pooling scale to pool each of areas, corresponding to each of the k ROIs, on the feature map per each of their scales, to thereby output each of k first feature vectors corresponding to each of the k ROIs per each of their scales, (ii) instructing each of first fully connected (FC) layers corresponding to each of the pooling layers to output each of k second feature vectors per each of their scales by using each of the k first feature vectors per each of their scales, and (iii) instructing one or more second FC layers to output each of class information and each of regression information corresponding to each of the k ROIs by using each of the k second feature vectors per each of their scales, and (III) instructing a first loss layer to generate class losses and regression losses corresponding to the k ROIs by referring to each of the class information, each of the regression information, and their corresponding first ground truths (GTs), to thereby learn the second FC layers, the first FC layers, and the convolutional layer through backpropagation by using the class losses and the regression losses.

16. The learning device of claim 15, wherein the k ROIs are selected among predetermined ROI candidates by the RPN, and
wherein, after the process of (I), the processor instructs a second loss layer to generate ROI losses by referring to the ROI candidates and their corresponding second GTs, to thereby learn the RPN through backpropagation by using the ROI losses.

17. The learning device of claim 15, wherein the second FC layers include a (2-1)-st FC layer and (2-2)-nd FC layers, and
wherein, at the process of (II), the processor (i) instructs the (2-1)-st FC layer to concatenate each of the k second feature vectors per each of their scales outputted from each of the first FC layers, to thereby output a third feature vector and (ii) instructs the (2-2)-nd FC layers to output each of the class information and each of the regression information corresponding to the k ROIs by using the third feature vector.

18. The learning device of claim 15, wherein, at the process of (III), the processor learns each of the first FC layers by using at least part of each of the class losses and each of the regression losses corresponding to each of the k second feature vectors per each of their scales outputted from each of the first FC layers.

19. The learning device of claim 18, wherein the processor learns each of the first FC layers through backpropagation by applying each of weights to each of the class losses and each of regression losses, wherein said each of weights are determined by referring to information on degrees of contribution by each of the first FC layers to each of the class losses and each of the regression losses.

20. The learning device of claim 15, wherein the processor determines each of the number of channels of each of the second feature vectors per each of their scales outputted from each of the first FC layers to be same with each other.

21. The learning device of claim 15, wherein the processor determines a total number of channels of the second feature vectors outputted from each of the first FC layers to be less than a predetermined number.

22. A testing device for testing a convolutional neural network (CNN)-based object detector, comprising:
at least one memory that stores instructions; and
at least one processor, on condition that a learning device (1) has instructed at least one convolutional layer to apply at least one convolution operation to a training image, to thereby output at least one feature map for training and has instructed a region proposal network (RPN) to output k regions of interest (ROIs) for training in the training image by using the feature map for training, (2) (i) has instructed each of pooling layers having each different pooling scale to pool each of areas, corresponding to each of the k ROIs for training, on the feature map for training per each of their scales, to thereby output each of k first feature vectors for training corresponding to each of the k ROIs for training per each of their scales, (ii) has instructed each of first fully connected (FC) layers corresponding to each of the pooling layers to output each of k second feature vectors for training per each of their scales by using each of the k first feature vectors for training per each of their scales, and (iii) has instructed one or more second FC layers to output each of class information for training and each of regression information for training corresponding to each of the k ROIs for training by using each of the k second feature vectors for training per each of their scales, and (3) has instructed a first loss layer to generate class losses and regression losses corresponding to the k ROIs for training by referring to each of the class information for training, each of the regression information for training, and their corresponding first ground truths (GTs), to thereby learn the second FC layers, the first FC layers, and the convolutional layer through backpropagation by using the class losses and the regression losses; configured to execute the instructions to: perform processes of (I) (i) instructing the convolutional layer to apply at least one convolution operation to a test image including at least one object, to thereby output at least one feature map for testing and (ii) instructing the RPN to output m ROIs for testing in the test image by using the feature map for testing, and (II) (i) instructing each of the pooling layers having each different pooling scale to pool each of areas, corresponding to each of the m ROIs for testing, on the feature map for testing per each of their scales, to thereby output each of m first feature vectors for testing corresponding to each of the m ROIs for testing per each of their scales, (ii) instructing each of the first FC layers corresponding to each of the pooling layers to output each of m second feature vectors for testing per each of their scales by using each of the m first feature vectors for testing per each of their scales, and (iii) instructing the second FC layers to output each of class information for testing and each of regression information for testing corresponding to each of the m ROIs for testing by using each of the m second feature vectors for testing per each of their scales.

23. The testing device of claim 22, wherein the k ROIs for training are selected among predetermined ROI candidates for training by the RPN, and
wherein the learning device has instructed a second loss layer to generate ROI losses by referring to the ROI candidates for training and their corresponding second GTs, to thereby learn the RPN through backpropagation by using the ROI losses.

24. The testing device of claim 22, wherein the second FC layers include a (2-1)-st FC layer and (2-2)-nd FC layers, and
wherein, at the process of (II), the processor (i) instructs the (2-1)-st FC layer to concatenate each of the m second feature vectors for testing per each of their scales outputted from each of the first FC layers, to thereby output a third feature vector for testing and (ii) instructs the (2-2)-nd FC layers to output each of the class information for testing and each of the regression information for testing corresponding to the m ROIs for testing by using the third feature vector for testing.

25. The testing device of claim 22, wherein, at the process of (3), the learning device has learned each of the first FC layers by using at least part of each of the class losses and each of the regression losses corresponding to each of the k second feature vectors for training per each of their scales outputted from each of the first FC layers.

26. The testing device of claim 25, wherein the learning device has learned each of the first FC layers through backpropagation by applying each of weights to each of the class losses and each of regression losses, wherein said each of weights are determined by referring to information on degrees of contribution by each of the first FC layers to each of the class losses and each of the regression losses.

27. The testing device of claim 22, wherein the processor determines each of the number of channels of each of the second feature vectors for testing per each of their scales outputted from each of the first FC layers to be same with each other.

28. The testing device of claim 22, wherein the processor determines a total number of channels of the second feature vectors for testing outputted from each of the first FC layers to be less than a predetermined number.

* * * * *